United States Patent
Gerundt et al.

(10) Patent No.: US 9,010,510 B2
(45) Date of Patent: Apr. 21, 2015

(54) DUAL CLUTCH FOR A DUAL CLUTCH TRANSMISSION

(75) Inventors: Oliver Gerundt, Friolzheim (DE); Uwe Bauer, Schwieberdingen (DE); Bernhard Schlagmueller, Moeglingen (DE); Ulrich Kappenstein, Knittlingen (DE); Stefan Tumback, Stuttgart (DE); Yang Shen, München (DE); Carolin Scholler, Marbach am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 1431 days.

(21) Appl. No.: 12/440,187

(22) PCT Filed: Jun. 1, 2007

(86) PCT No.: PCT/EP2007/055384
§ 371 (c)(1),
(2), (4) Date: Jan. 5, 2010

(87) PCT Pub. No.: WO2008/037513
PCT Pub. Date: Apr. 3, 2008

(65) Prior Publication Data
US 2010/0108456 A1 May 6, 2010

(30) Foreign Application Priority Data
Sep. 25, 2006 (DE) .......................... 10 2006 045 163

(51) Int. Cl.
| | |
|---|---|
| *F16D 21/02* | (2006.01) |
| *F16D 21/06* | (2006.01) |
| *F16D 23/12* | (2006.01) |
| *F16D 27/12* | (2006.01) |
| *F16D 28/00* | (2006.01) |

(52) U.S. Cl.
CPC ................ *F16D 27/12* (2013.01); *F16D 21/06* (2013.01); *F16D 23/12* (2013.01); *F16D 28/00* (2013.01); *F16D 2021/0684* (2013.01)

(58) Field of Classification Search
USPC ...................................... 192/48.2, 48.9, 48.91
See application file for complete search history.

(56) References Cited

U.S. PATENT DOCUMENTS

| | | | |
|---|---|---|---|
| 2,055,258 A | 9/1936 | McNeil | |
| 8,151,961 B2* | 4/2012 | Tumback | 192/48.2 |
| 2005/0139442 A1* | 6/2005 | Agner et al. | 192/48.8 |
| 2005/0205376 A1* | 9/2005 | Kemper | 192/48.2 |
| 2007/0144857 A1* | 6/2007 | Tsukada et al. | 192/48.8 |
| 2009/0301835 A1* | 12/2009 | Tumback | 192/48.2 |

FOREIGN PATENT DOCUMENTS

| | | | |
|---|---|---|---|
| DE | 103 13 435 | 10/2003 | |
| DE | 10 2004 016 177 | 10/2005 | |
| DE | 102006045163 A1 * | 4/2008 | F16D 27/12 |
| EP | 1 178 234 | 2/2002 | |

* cited by examiner

Primary Examiner — Gene Crawford
Assistant Examiner — Ryan Dodd
(74) Attorney, Agent, or Firm — Kenyon & Kenyon LLP

(57) ABSTRACT

The invention relates to a dual clutch for a dual clutch transmission for transmitting a torque from a drive shaft to at least one drive shaft, which comprises a first clutch, a second clutch, and an electrical actuating device. The actuating device comprises a coupling slide, wherein a first slide of the coupling slide acts on the first clutch, and a second slide of the coupling slide acts on the second clutch, and the two slides are movable in such a way that by displacing the slides a recoupling process is controlled.

11 Claims, 3 Drawing Sheets

DUAL CLUTCH FOR A DUAL CLUTCH TRANSMISSION

TECHNICAL FIELD

The invention relates to a dual clutch for a dual clutch transmission according to the preamble of claim 1.

BACKGROUND

Dual clutch transmissions for the actuation of motor vehicles, which comprise two sub-transmissions, which in each case have a main clutch, are known from the technical field. The aforementioned main clutches are actuated by means of hydraulic actuating elements. Aside from these, clutches are known, which are actuated by means of electrical actuators, as for example electric motors, and suitable kinematics assigned to said actuators. A clutch is in each case actuated by a motor with an assigned kinematics, which is appropriately designed, independently of the other one.

With regard to clutches actuated by means of electric motors, the electric motors are constantly supplied with current not only for closing the clutches but also for keeping them closed. The result is that the electric motors have to be adequately sized and the power electronics have to meet the required demands. With regard to clutches, which are controlled by an electric motor, it must be ensured that each of the two clutches of the dual clutch transmission can in each case be completely closed by an electric motor independently of each other. For this purpose, each of the two available electric motors has to produce the maximum closing force, which requires adequately powerful and therefore expensive electric motors. If an error occurs, both of the clutches open, which in each case are driven by an electric motor, so that the drag torque of the internal combustion engine is no longer available and the engine brake is ineffective. Thus, on the one hand a blocking of the transmission is prevented; however, on the other hand, the engine brake is ineffective.

The European patent EP 1 178 234 B1 refers to a clutch arrangement. The clutch arrangement serves to transmit a torque from the drive shaft to an output shaft with a first coupling element and a second coupling element. The first coupling element is connected to the drive shaft and the second coupling element to the output shaft. Provision is made for an actuator, which specifies a nominal value for a torque to be transmitted with the clutch, as well as for an adjusting device, which uses the rotational power of the drive shaft for engaging and/or disengaging the coupling elements. The engaging and/or disengaging of the coupling elements results via a bevel toothed gear. The adjusting device is directly connected to the drive shaft and uses its rotational power squarely for positioning the coupling elements. In so doing, the actuating energy for the adjusting device, which is required for actuating the clutch arrangement, can be directly drawn from the drive train, respectively the drive shaft. The energy drawn from the drive train for an actuation of the clutch arrangement via the adjusting device is not initially used for driving an electric motor, an electric magnet or a hydraulic cylinder. On the contrary, the energy of the drive train is directly supplied without conversion to the adjusting device in order to actuate the clutch arrangement.

SUMMARY

A dual clutch configured according to the invention for a dual clutch transmission for transmitting a torque from a drive shaft to at least one output shaft comprises a first clutch, a second clutch as well as an electrical actuating device. The actuating device comprises a coupling slide, wherein a first slide of the coupling slide acts on the first clutch, and a second slide of the coupling slide acts on the second clutch, and the two slides are movable in such a way that by displacing the slides a recoupling process is controlled.

When employing a self-locking actuator, it is an advantage of the dual clutch according to the invention, that the current supply to the actuators, as a function of the design of the actuators, is only required when shifting as well as in individual operating states of the motor vehicle, i.e. if the motor vehicle is operated under full load. For this purpose, the two slides can preferably be jointly displaced with a first electrical actuator. A recoupling process is thereby controlled by a single actuator. A clutch is in each case closed in the end positions of the electrical actuator and the other one is open. If then the actuator is actuated, a recoupling is made from one clutch to the other one.

In a preferred embodiment, the two slides can be displaced towards one another with a second electrical actuator. The recoupling process is corrected by the second electrical actuator. This can, for example, be necessary for reasons of driving comfort.

In an embodiment, the first actuator comprises a spindle, which moves the entire coupling slide by rotation. If a force is now exerted on a slide by the clutch, this force can simultaneously be used to move the other slide. It is hereby possible to use a force transmitted from the opening clutch to the corresponding coupling slide in order to close the second clutch. As a result of this, the required output of the electrical actuator is reduced when implementing a recoupling process.

The first electrical actuator, with which the entire coupling slide can be displaced, preferably comprises a threaded spindle, a chain drive, a gear drive or a rack and pinion drive. Any other arbitrary additional drive is also suitable, with which the entire coupling slide can be moved.

In order that the slides of the coupling slide can be moved in opposite directions, the spindle, with which the slides are driven with the second actuator, preferably comprises a left-handed thread and a right-handed thread. The one slide is moved with the left-handed thread and the other with the right-handed thread. It is also alternatively possible for the second actuator for moving the slides to comprise acme screw thread, ball screws, worm gears or other arbitrary gears, which are known to the specialist. Thus, it is, for example, also possible for the spindle to be mounted in a slide and to have a thread, whereupon the other slide is moved.

According to the invention, ramps are configured in each case on the slides, whereby the clutches are actuated. Spring levers, with which a clutch is opened or closed, are activated via the ramps. The progression of the recoupling process is specified by the form of the ramps on the slides. It is then, for example, possible for the ramps to have a constant gradient. The gradient of the ramps is, however, preferably configured in the form of a root function. The advantage of the configuration of the ramps with a profile with a root function is that a larger gradient can as a result be assigned to the smaller spring tension of a clutch and a smaller gradient to the greater spring tension. In this way, the displacement forces cancel each other out.

Besides the form of a root function, the gradient can also assume any additional form. The gradient can preferably be described by a mathematical function. A gradient in the form of a logarithmic function, a parabola or a hyperbola is, for example, also possible.

The gradients of the ramps are preferably adapted in such a way that the coupling slide is brought into a stable position when a breakdown in the tension occurs. Moreover, it is possible to exert a pre-load by means of a spring element, so that the slide can be drawn into a stable position if a breakdown in the tension occurs.

In order that the coupling slide can be moved into a neutral position, i.e. a position, in which both clutches are open, it is necessary for provision to be made for non-self-locking drives for the absolute displacement of the entire coupling slide. Non-self-locking drives, however, require that a force is transmitted to the coupling slide to provide the torque transmission.

If the first actuator, which moves the entire coupling slide, is implemented without self-locking, both of the slides (assuming an appropriately configured gradient of the ramp) in the event of a breakdown in the tension are displaced in such a way, that one clutch is closed and the other is open. The gradient of the ramp has to thereby be configured in such a manner that the reset force of the clutch, which is opening, is greater than the closing force, which is required for the closing of the other clutch. This can be guaranteed in an additional embodiment by means of an appropriate mechanism, with which the slide is pushed into a defined secure position. By virtue of the fact that when a breakdown in tension occurs, the slide is displaced in such a manner that one clutch is closed and the other is open, the engine brake is also available when a breakdown in tension occurs. Furthermore, locking of the transmission, as it would occur if both clutches are closed, is prevented.

Spring elements are preferably used for opening and closing the clutches, each spring element acting with one side via an axial bearing and if need be a pressure sleeve against a ramp and with the other side against a pressure plate. Spring levers or disc springs, for example, are suitable as spring elements. The respective clutch disk is pressed with the pressure plate against a clutch block, which is driven by the internal combustion engine. One of the pressure sleeves is preferably guided in the other pressure sleeve, the pressure sleeves being able to be displaced in the axial direction to each other.

The spring force on the spring element of the clutch, which is opening, preferably supports the movement of the spring element of the clutch, which is closing. The advantage of which is that at least one of the actuators with the associated power electronics can have a smaller size and thus be more cost effective.

Both clutches are open only when stopping and during driveaway of the motor vehicle. When shifting the dual clutch transmission, one clutch is opened as a rule while the other one is closed at the same time.

It is the advantage of the dual clutch embodied according to the invention that the electrical actuator, which controls the recoupling process, has to produce a smaller amount of power output. In so doing, the expenses for the electrical actuator and the necessary power electronics are reduced. Furthermore, the necessity of continually supplying the electric motors with current is eliminated as a function of the design of the gradients of the first ramp, respectively the second ramp. For this purpose, the ramps are designed in such a manner, that in the event that the first actuator, respectively the second actuator, is not supplied with current, the slides are positioned to each other in such a manner that one clutch is open and the other is closed. This has the further advantage that in the event of a system breakdown, the engine brake remains intact. An emergency operation function is possible when the actuators fail.

BRIEF DESCRIPTION OF THE DRAWINGS

Examples of embodiment of the invention are depicted in the drawings and are explained in detail in the following description.

The following are shown.

DETAILED DESCRIPTION

Figure 1:
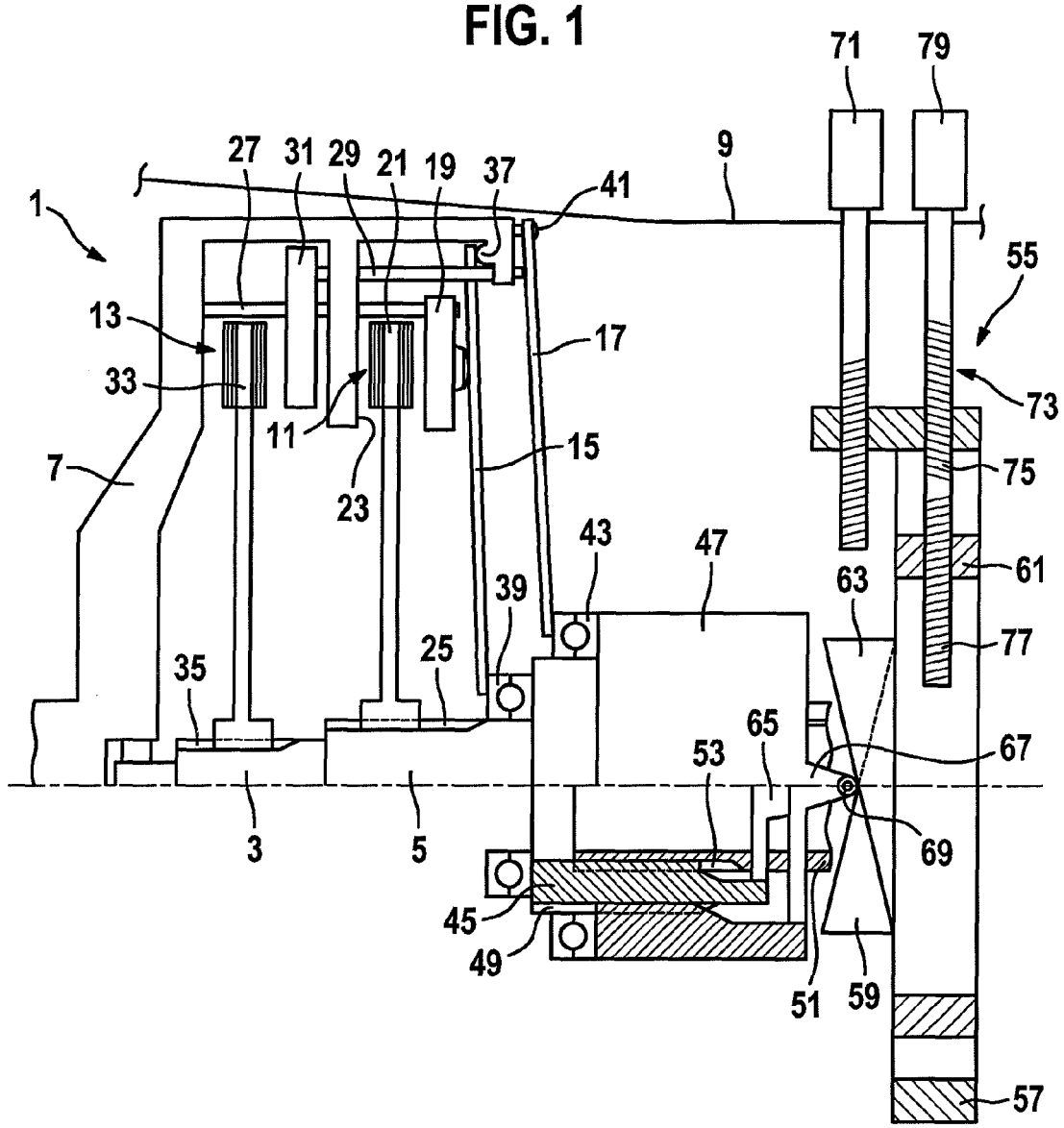
FIG. 1 is a schematic depiction of a dual clutch designed according to the invention.

FIG. 1 shows a dual clutch for a dual clutch transmission designed according to the invention.

A double clutch transmission 1, comprising two sub-transmissions with a clutch being assigned to each one, transmits the torque produced in an internal combustion engine, which is not depicted here, to a drive shaft 3 of the first sub-transmission, respectively a drive shaft 5 of the second sub-transmission, which encloses said drive shaft 3. The internal combustion engine of concern is as a rule an internal combustion engine with a plurality of cylinders, for example a self-igniting internal combustion engine or one with an externally-supplied ignition. A rotational movement is transmitted by the internal combustion engine to a clutch block 7 of the dual clutch 1. The dual clutch 1 is enclosed by a housing 9.

A first clutch 11 and a second clutch 13 of the dual clutch 1 are mounted within the housing 9. The first clutch 11 is arranged on the inside, while the second clutch 13 is arranged on the outside. Both clutches 11, 13 of the dual clutch 1 are mounted concentrically with respect to each other within the housing 9. Besides the clutches 11, 13, which are depicted here equally sized, the clutches 11, 13 can also be configured in different sizes.

The clutches 11, 13 can, for example, be configured as dry clutches or as wet clutches. Suitable clutches 11, 13 are, for example, single disk clutches, multiple disk clutches or multi-plate clutches.

A first spring element 15 configured as a spring lever is assigned to the first clutch 11, while the second clutch 13 is impinged upon by a second spring element 17, which is configured as a spring lever. Disc springs can also, for example, be used as the spring elements instead of the spring levers 15, 17. In order to close the first clutch 11, the first spring element 15 exerts a compressive force on the first pressure disk 19, which is pressed against a clutch disk 21 of the first clutch 11. With the aid of the pressure disk 19, the clutch disk 21 is then placed against a face 23, which is configured on the clutch block 7. In this way, the rotational movement of the clutch block 7 is transmitted to the clutch disk 21. In order that the clutch disk 21 can be placed against the face 23, the clutch disk 21 is mounted on the drive shaft 5 of the second sub-transmission in an axially displaceable manner. In the embodiment depicted in FIG. 1, the clutch disk 21 is guided in axially aligned grooves 25 for this purpose. The first pressure disk 19 is guided with guide pins 27. The guide pins 27 are connected to the clutch block 7. That means that the first pressure disk 19 and also the first spring element 15 rotate at the same speed, at which the clutch block 7 also rotates.

In order to close the second clutch 13, a spring tension of the second spring element 17 acts on a pin 29, which is connected to the second pressure disk 31. The second pressure disk 31 is pressed against a clutch disk 33 of the second clutch 13 in this manner and thus presses the clutch disk 33 against the clutch block 7. The second clutch disk 33 is also mounted in an axially displaceable manner. For this reason, grooves 35 are configured in the drive shaft 3 of the first sub-transmission; and in so doing, the clutch disk 33 can be displaced in said grooves 35. In the embodiment depicted in FIG. 1, the torque of the clutch block 7 is transmitted in this manner to the drive shaft 5 of the second sub-transmission by the first clutch 11 when said clutch 11 is closed. When the second clutch 13 is closed, the torque of the clutch block 7 is transmitted to the drive shaft 3 of the first sub-transmission.

In order that a spring tension of the spring elements 15, 17 can be transmitted to the pressure disks 19, 31, the first spring element 15 is mounted with one side at a first pivotal point 37 on the clutch block 7 and with the other side at a first compression bearing 39. The second spring element 17 is correspondingly mounted at a second pivotal point 41 on the clutch block 7 and with the other side at a second compression bearing 43. In order to achieve an even force distribution on the clutch disks 21, 33, a plurality of spring elements 15, 17 is preferably assigned to each clutch disk.

According to the embodiment depicted in FIG. 1, the first compression bearing 39 is placed against a first pressure sleeve 45 and the second compression bearing 43 against a second pressure sleeve 47. The compression bearings 39, 41 are in each case configured as axial bearings because the spring elements 15, 17 move at the rotational speed of the clutch block 7, whereas the pressure sleeves 45, 47 are stationary and do not execute rotational movement.

Instead of the pressure sleeves 45, 47, it is also possible to use throw-out bearings, which are linked with the clutch housing via levers. The throw-out bearings can move in the axial direction with respect to the dual clutch. A radial movement or movement in the circumferential direction is prevented by the lever. Installation space can be saved by the throw-out bearings vis-à-vis the use of pressure sleeves 45, 47.

In order to close the first clutch 11, the first pressure sleeve 45 moves in the direction of the clutch blocks 7. Through this action, the compression bearing 45 located at the first pressure sleeve 45 is axially moved in this direction and consequently exerts a force on the first spring element 15. The first spring element 15 pushes on the pressure disk 19 and consequently places said disk 19 against the face 23 on the clutch block 7. When the second clutch 13 is to be closed, the second pressure sleeve 47 is correspondingly moved in the direction of the clutch block 7. This leads to a movement of the second compression bearing 43 likewise in the direction of the clutch block 7, whereby a force acts on the second spring element 17. The second spring element 17 pushes against the guide pin 29, which is connected to the second pressure disk 31, and thus presses the second pressure disk 31 against the clutch disk 33 of the second clutch 13. The clutch disk 33 of the second clutch 13 is therefore placed against the clutch block 7. In order to achieve a stable guidance of the second pressure disk 31, it is possible that said disk 31 likewise is guided via the guide pin 27.

A radial movement of the first pressure sleeve 45 and the second pressure sleeve 47 is thereby avoided, in that the pressure sleeves 45, 47 are fit into each other. For this purpose, at least one groove 49 is configured on the first pressure sleeve 45, wherein the second pressure sleeve 47 is integrated and is axially displaceable. A rotational movement of the first pressure sleeve 45 is thereby avoided, so that said sleeve 45 is guided in a stationary shaft 51. For this reason, at least one groove 53 running in the axial direction, wherein the first pressure sleeve 45 is guided, is likewise preferably configured in the stationary shaft 51.

In order to be able to displace the first pressure sleeve 45 and the second pressure sleeve 47 in the axial direction, the dual clutch 1 configured according to the invention comprises a coupling slide 55. The coupling slide 55 comprises a first slide 57, whereupon a first ramp 59 is configured, and a second slide 61, which is furnished with a second ramp 63.

In order to be able then to move the first pressure sleeve 45 and the second pressure sleeve 47 in the axial direction, a first appendage 65 is configured on the first pressure sleeve 45. Said appendage 65 is placed against the first ramp 59. A second appendage 67, which is placed against the second ramp 63, is configured on the second pressure sleeve 47. In order to minimize wear, a roller 69 is configured in each case on the appendages 65, 67, which runs on the first ramp 59, respectively second ramp 63. The first pressure sleeve 45, respectively the second pressure sleeve 47, runs along the first ramp 59, respectively the second ramp 63, by means of a movement in the radial direction of the first slide 57, respectively the second slide 61. As a result of this, the movement of the slides 57, 61 carried out in the radial direction is transformed into an axial movement of the pressure sleeves 45, 47.

In order that a clutch 11, 13 opens in each case while the other clutch 11, 13 closes at the same time, the gradients of the ramps 59, 63 are implemented in opposite directions. If the slides 57, 61 are displaced in the same direction, one of the two pressure sleeves 45, 57 is then moved in the direction of the clutch block 7, while the second of two pressure sleeves 45, 47 is moved away from the clutch block 7. One of the two clutches 11, 13 closes, while the other of the two clutches 11, 13 is opened.

Provision is made for a first actuator 71 for recoupling by means of parallel displacement of the slides 57, 61. The entire coupling slide 55 can be moved in the radial direction by the first actuator 71.

A compressive force acts on the compression bearing 39, 43 and thereby on the pressure sleeve 45, 47 via the spring element 15, 17 of the closed clutch 11, 13. The opening movement of the clutch 11, 13 is supported by this compressive force. At the same time, the compressive force eases the movement of the slide 57, 61. The first actuator 71 can consequently be scaled smaller.

In order if necessary to be able to correct the recoupling process, provision is made for a second actuator 79, with which the slides 57, 61 can be moved in opposite directions.

An even movement of the slides 57, 61 is thereby achieved, in that they are activated by a common actuator 79. A movement of the slides 57, 61 in opposite directions is thereby achieved, in that the second actuator 79 comprises a spindle 73, whereupon a right-handed thread 75 and a left-handed thread 77 are configured. The first slide 57 thereby runs on the right-handed thread 75 and the second slide 61 on the left-handed thread 77. It is also, of course, alternatively possible for the first slide 57 to run on the left-handed thread and the second slide 61 on the right-handed thread 55. When the spindle 73 is in rotary motion, the first slide 57 moves in a certain direction while the second slide 61 is moved in the opposite direction. Instead of the first spindle 73 having left-handed and right-handed thread, the spindle can, for example, alternatively comprise acme screw thread, ball screws, cable controls or worm gears. The spindle 73 can also be mounted in one of the slides 57, 61 and have a thread, whereupon the other slide 57, 61 is moved.

Figure 2:
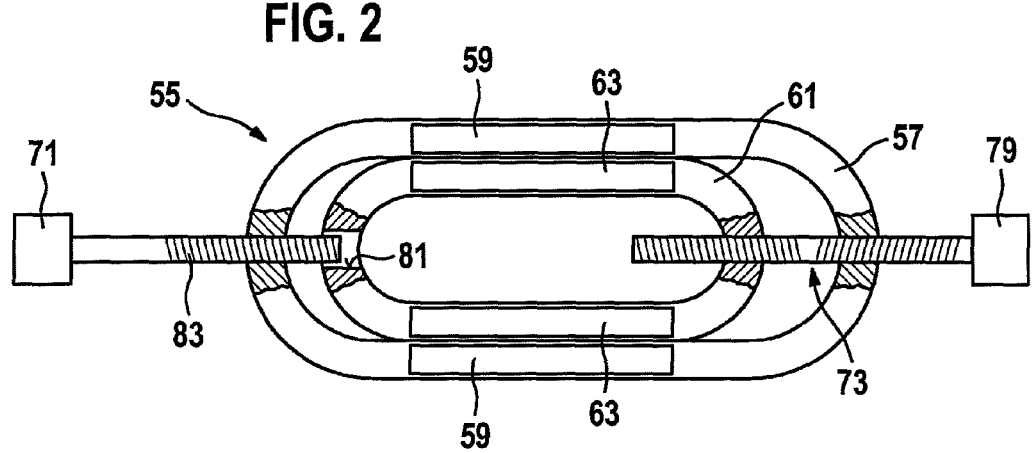
FIG. 2 is a schematic depiction of a coupling slide from a top view.

FIG. 2 shows a coupling slide 55 configured according to the invention from a top view.

The coupling slide 55 configured according to the invention comprises the first slide 57 and the second slide 61. The slides are in each case ovally configured in the embodiment, which is depicted here, so that each slide has two ramps 59, respectively 63. The two ramps prevent the pressure sleeves 43, 45 from canting. Besides the oval shape depicted here, the slides 57, 61 can, of course, assume any additional shape known to the specialist, wherein in each case at least two ramps 59, 63 can be configured side by side on one of the slides 57, 61, whereby a canting of the pressure sleeves 45, 47 is avoided during movement. In the top view depicted here, the first actuator 71, with which the slides 57, 61 can together be displaced parallel to each other, is arranged across from the second actuator 79. In order that a movement of the entire coupling slide 55 is possible with the first actuator 71, without hindering the displacement of the slides 57, 61 in the opposite direction, a bore-hole 81 is configured in the second slide 61, through which a spindle 83 is guided, which is connected to the first actuator 71. By rotating the second spindle 83, the entire coupling glide 55 together with the second actuator 79 is moved. Instead of the spindle 83, it is also possible to make provision for any other arbitrary drive mechanism, which is known to the specialist, whereby a radial displacement of the entire coupling slide 55 is possible. Such drives are, for example, chain drives, gear wheels, gear racks etc.

Figure 3:
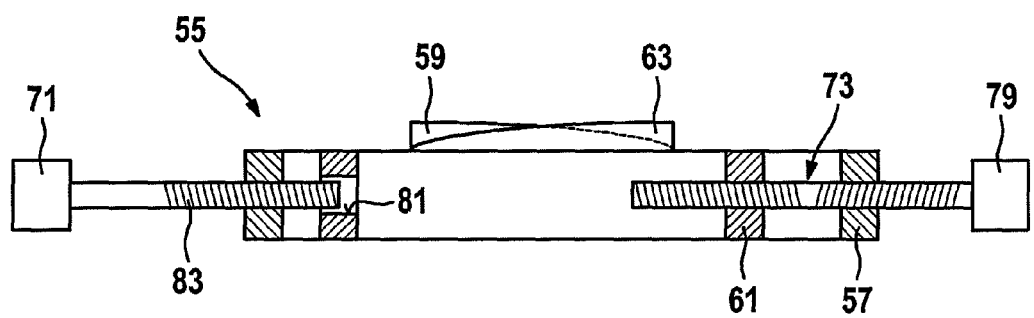
FIG. 3 is a sectional view of a coupling slide designed according to the invention in a first embodiment.

FIG. 3 shows a sectional view of a coupling slide 55 configured according to the invention as per FIG. 2.

FIG. 3 makes apparent how the first ramp 59 and the second ramp 63, which are integrated onto the slides 57, respectively 61, are configured. In contrast to the embodiment depicted in FIG. 1, wherein the gradient of the slides 59, respectively 63, runs linearly, the ramps 59 and 63 in the embodiment depicted in FIG. 3 have a gradient in the form of a root function. The advantage of this form is that a larger gradient is assigned to the smaller spring tension of the spring element 15, respectively 17, which acts on the ramp 59, respectively 63, when the clutch is open; and a smaller gradient is assigned to the greater clutch spring tension of the spring elements 15, 17 when the clutch is closed. In this way, the displacement forces cancel each other out. As a result of the action of the first actuator 71, only just a very small force thus needs to be applied to displace the slides 57, 61.

Figure 4:
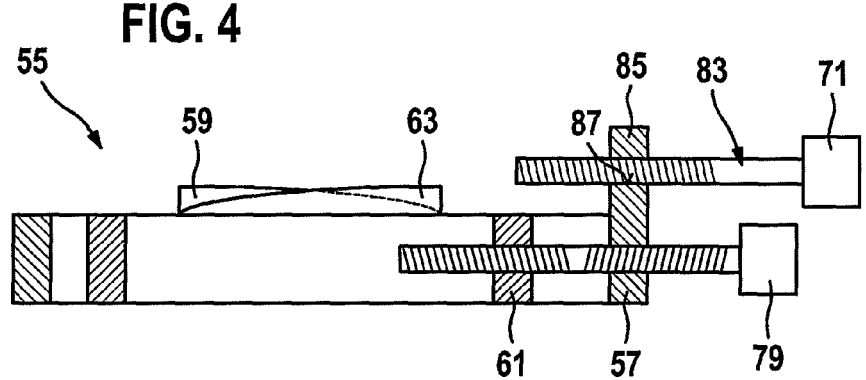
FIG. 4 is a sectional view of a coupling slide designed according to the invention in a second embodiment.

FIG. 4 shows a coupling slide 55 configured according to the invention in a second embodiment.

According to the embodiment depicted in FIG. 4, the first actuator 71, with which the entire coupling slide 55 together with the second actuator 79 is moved, is not arranged across from the second actuator 79, but parallel to it.

Because of this arrangement, an appendage 85 is configured on the first slide 57. A bore-hole 87 configured in said appendage 85 has inside thread, wherein the second spindle 83 is guided.

Figure 5:
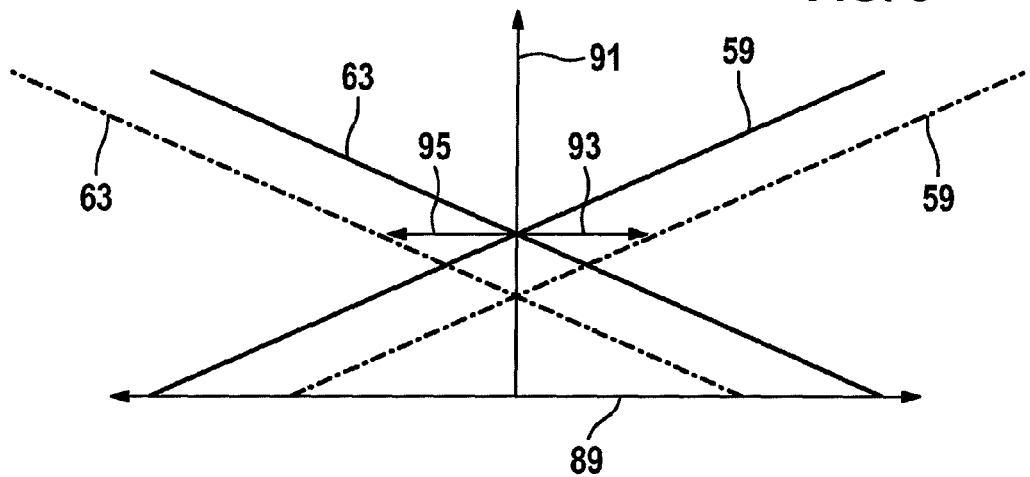
FIG. 5 is a relative displacement of the two slides of the coupling slide.

In FIG. 5, the relative displacement of the two slides 57, 59 of the coupling slide 55 is depicted. In so doing, the radial movement of the slides 57, 59 is depicted on the x-axis 89, and the gradient of the ramps 59 and 63 is depicted on the y-axis 91. The position of the slides 57, 59 at a first point in time is depicted with a solid line. The two slides 57, 59 are now displaced towards each other by the second actuator 79.

As a result of this, the first slide 57 moves in the one direction as depicted by the arrow 93, while the second slide 61 moves in the opposite direction as depicted with arrow 95.

The positions of the slides 57, 61 at a second point in time are depicted with a dot and dash line. The form of the ramps 59, 63 in the embodiment depicted in FIG. 5 is linearly rising.

Figure 6:
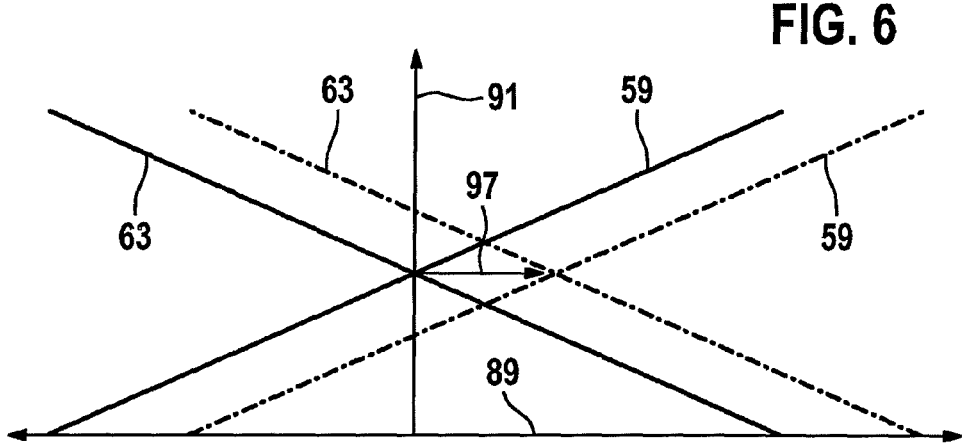
FIG. 6 is the displacement of the entire coupling slide.

In FIG. 6, a displacement of the entire coupling slide 55 is depicted, whereby a recoupling process results. The slides 57, 61 are initially situated in a starting position, whereat one of the two clutches 11, 13 is open and the other is closed. The entire coupling slide 55 is displaced when the first actuator 71 is actuated. The arrow denoted with the reference numeral 97 shows this action. Also in the embodiment depicted in FIG. 6, the movement of the slide 57, 61 is depicted on the x-axis, while the gradient of the ramps 59, 63 is depicted on the y-axis. In so doing, the starting position of the coupling slide 55 is depicted with a solid line, and the position of the coupling slide 55 after the displacement is depicted with a dot and dash line. As is apparent in FIG. 6, the position of the ramps 59, 63 does not change with respect to each other when a displacement of the entire coupling slide 55 takes place. In the second position, the clutch 11, 13 is now closed, which initially was open, and the other one is now open.

Figure 7:
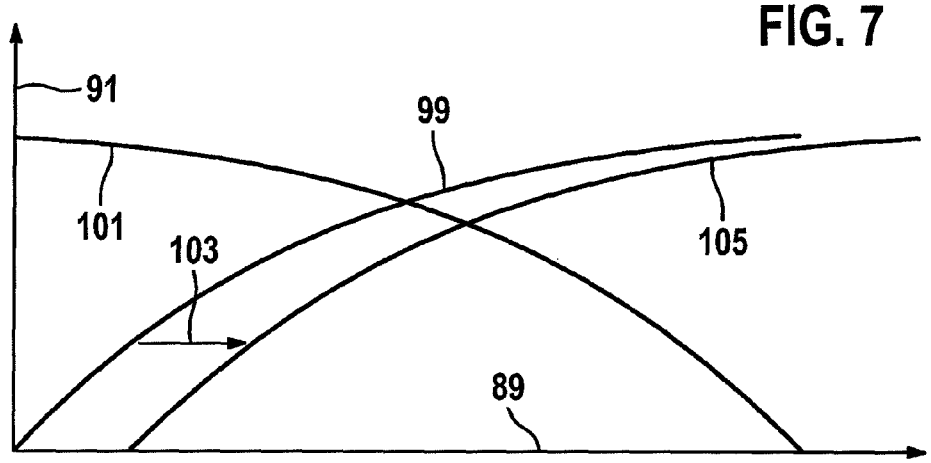
FIG. 7 is the displacement path of a coupling slide with ramps in the form of a root function.

In FIG. 7, the distance, which was covered by the pressure sleeves 45, 47, is depicted as a function of the angle of rotation of the first actuator 71. The angle of rotation of the first actuator 71 is thereby plotted on the x-axis 89 and the distance covered by the pressure sleeves 45, 47 on the y-axis 91. The first spindle 73 is set into rotation by the rotational movement of the first actuator 71. The first slide 57 and the second slide 61 are displaced parallel to each other with increasing rotation of the spindle 73. At the beginning, the first clutch 11 is open and the second clutch 13 is closed. The distance covered by the first pressure sleeve 45, with which the first clutch 11 is opened and closed, is denoted with the reference numeral 99. The distance covered by the second pressure sleeve 47, with which the second clutch 13 is opened or closed, is denoted with the reference numeral 101. The first slide 57 and the second slide 61 are displaced parallel to each other by the rotational movement of the first actuator 71. This leads to a movement of the first pressure sleeve 45, respectively the second pressure sleeve 47, due to the ramps 59, 63, which are configured on the first slide 57 and the second slide 61. On account of the movement, the second clutch 13, which is closed at the beginning, is opened, while the first clutch 11, which is open at the beginning, is closed. The distance covered by the pressure sleeves 43, 45 is thereby dependant on the gradient of the ramps 59, 63. In order to cover a distance, as it is depicted in FIG. 7, the ramps 59, 63 are configured with a gradient in the form of a root function. Besides the gradient in the form of a root function, the ramp can also assume any other gradient, which can be depicted by a mathematical function. It is therefore, for example, also possible for the gradient to be configured in the form of a logarithmic function, a hyperbola or a parabola. This leads to the fact, that the clutch, which is being closed, initially covers a large distance with little movement of the first actuator 71; and as the closing activity of the clutch increases, the distance, which is covered as a result of the movement of the actuator 71, becomes smaller. Correspondingly with regard to the clutch, which is being opened, a smaller distance is initially covered; and the wider the clutch is opened, the greater is the distance, which is covered by the clutch at the same amount of travel by the actuator 71. When the second actuator 79 is actuated, the slides 57, 59 are moved in opposite directions. Such a displacement is exemplary depicted for the first pressure sleeve 45. The displacement path is denoted with the arrow 103. The curve of the actuation displacement of the first pressure sleeve 45 is denoted with the reference numeral 105.

The invention claimed is:

1. A dual clutch for a dual clutch transmission for transmitting a torque from a drive shaft to at least one output shaft, comprising;
   a first clutch;
   a second clutch; and
   an electrical actuating device, wherein the actuating device comprises a coupling slide, wherein a first slide of the coupling slide acts on the first clutch by causing axial movement of a first pressure sleeve, and a second slide of the coupling slide acts on the second clutch by causing axial movement of a second pressure sleeve, and wherein the first slide comprises a first ramp for actuating the first clutch and the second slide comprises a second ramp for actuating the second clutch, wherein the gradients of the first and the second ramps are implemented in opposite directions, and wherein the first and second slides are movable, and wherein coupling and uncoupling of the first and second clutches can be controlled by moving the first and second slides and wherein the entire coupling slide can be moved with a first electrical actuator in order to close one of the first and second clutches while the other one of the first and second clutches is opened.

2. The dual clutch of claim 1, wherein the second actuator comprises a spindle that moves the first slide and the second slide in opposite directions.

3. The dual clutch of claim 2, wherein the spindle comprises a right-handed thread and a left-handed thread, an acme screw thread, one or more ball screws, one or more cable controls or a worm gear, or wherein the spindle is mounted in one of the first and second slides and has a thread, whereupon the other of the first and second slides is moved.

4. The dual clutch of claim 2, wherein the spindle comprises a right-handed thread and a left-handed thread, and wherein one of the first and second slides is moved with the left-handed thread and the other of the first and second slides with the right-handed thread.

5. The dual clutch of claim 1, wherein the first electrical actuator comprises a threaded spindle configured to move the entire coupling slide.

6. The dual clutch of claim 1, wherein the first and second ramps have a constant gradient.

7. The dual clutch of claim 1, wherein the first and second ramps have a gradient in the form of a root function or a logarithmic function.

8. The dual clutch of claim 1, wherein a first spring element and a second spring element are used for coupling and uncoupling the first and second clutches, wherein a first end of each of the first and a second spring elements is operationally coupled with a compression bearing configured as an axial bearing or a first or second pressure sleeve or a bearing, wherein a second end of each of the first and second spring elements is operationally coupled with a pressure disk, and wherein the first and second pressure sleeves may be slidably operationally coupled with the first and second ramps.

9. The dual clutch of claim 8, wherein one of the first and second pressure sleeves is guided within the other pressure sleeve, and wherein the first and second pressure sleeves are displaceable in an axial direction relative to each other.

10. The dual clutch of claim 9, wherein during the recoupling a coupling process, the spring tension on the spring lever element of the first or second clutch that is opening supports the movement of the spring lever element of the opposite clutch that is closing.

11. The dual clutch of claim 1, wherein the entire coupling slide with the first and second ramps can be moved in a radial direction with a first electrical actuator.

* * * * *